(12) United States Patent
Schwalbe et al.

(10) Patent No.: US 10,118,650 B1
(45) Date of Patent: Nov. 6, 2018

(54) ENGINE ACCESS DOOR SLIDE TRACK SYSTEM

(71) Applicant: CNH Industrial America LLC, New Holland, PA (US)

(72) Inventors: Blaine Schwalbe, Valders, WI (US); Ross Christiansen, Kiel, WI (US); Steven N. Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/661,206

(22) Filed: Jul. 27, 2017

(51) Int. Cl.
*B62D 25/12* (2006.01)
*E05D 15/06* (2006.01)

(52) U.S. Cl.
CPC ......... *B62D 25/12* (2013.01); *E05D 15/0656* (2013.01); *E05Y 2900/518* (2013.01)

(58) Field of Classification Search
CPC .............. B62D 25/12; E05Y 2900/518; E05Y 2900/131; E05D 15/0656; E02F 9/0891
USPC ...................................................... 180/89.17
See application file for complete search history.

(56) References Cited

U.S. PATENT DOCUMENTS

| | | | |
|---|---|---|---|
| 3,312,990 A | 4/1967 | Lapworth | |
| 4,047,572 A * | 9/1977 | Stary | A62C 3/00 141/348 |
| 4,785,494 A | 11/1988 | Adamski | |
| 6,568,342 B2 | 5/2003 | Mielke et al. | |
| 7,108,093 B1 * | 9/2006 | Eckstedt | B60L 11/123 180/89.17 |
| 7,237,636 B2 * | 7/2007 | Ruppert | B60R 3/00 180/210 |
| 7,887,118 B2 | 2/2011 | Elliott et al. | |
| 7,950,719 B2 | 5/2011 | Elliott et al. | |
| 7,963,587 B2 | 6/2011 | Thiele et al. | |
| 9,188,026 B2 | 11/2015 | Calder et al. | |
| 2006/0000660 A1 * | 1/2006 | Moen | B62D 25/10 180/309 |
| 2010/0077667 A1 * | 4/2010 | Uto | B62D 25/10 49/381 |
| 2012/0325570 A1 * | 12/2012 | Rogers | B62D 25/10 180/89.17 |
| 2014/0027602 A1 | 1/2014 | Layland et al. | |

FOREIGN PATENT DOCUMENTS

WO 2015069350 5/2015

OTHER PUBLICATIONS

ROM Roll-up Doors Series III; http://.romcorp.com/products/compartment-access/rom-roll-up-doors.
Design of Dual Sliding Door Mechanism for a Small Sized Car; http://papers.sae.org/2007-01-0461/.

* cited by examiner

*Primary Examiner* — Drew J Brown
(74) *Attorney, Agent, or Firm* — Rebecca L. Henkel; Rickard K. DeMille

(57) ABSTRACT

An engine access door slide track system of an agricultural machine includes a support frame, a first engine access door, and a second engine access door. The support frame includes a plurality of frame members, a top track coupled to one of the plurality of frame members, and a bottom track included in one of the plurality of frame members. The first engine access door includes a top guide configured to interfit with the top track and a bottom guide configured to interfit with the bottom track. The second engine access door is coupled to the support frame.

20 Claims, 12 Drawing Sheets

ENGINE ACCESS DOOR SLIDE TRACK SYSTEM

FIELD OF THE INVENTION

The invention relates generally to agricultural product application equipment or agricultural machines such as self-propelled sprayers and, in particular, to an engine access door slide track system having a slide pad providing low friction engagement between an engine access door and the tracks above and below the engine access door.

BACKGROUND OF THE INVENTION

High-clearance sprayers are getting larger and more complex to allow for increasing coverage in a single pass, which improves application efficiency. These high-clearance sprayers require high horsepower engines with numerous engine drive accessories and systems such as exhaust after-treatment systems that need to be mounted near the engine. Inspective and servicing these accessories and systems can present challenges because of limited space inside of engine compartments.

Current design of the engine compartment has numerous different panels and covers that can be individually opened to allow access to different areas within the engine compartment. These include a pair of front engine cowling-type access doors that can be slid side-to-side to provide access into the engine compartment from the front. Current engine access doors have a corrugated door screen held in a frame. At the top and the bottom of the frame, flanges of the frame and a door holder abut each other and are sandwiched between a pair of plastic slides. A gap between each pari of upper and lower slides at the top and bottom of the door fits over a leg of corresponding upper and lower bracket. The upper and lower brackets provide fixed rails captured between the respective slides of the doors to internally guide movement of the doors between the upper and lower pairs of slides. The upper and lower brackets require individual mounting with respect to the engine compartment. At the engine access doors, the upper and lower pairs of slides require numerous components and fasteners for assembling to the door frames, which can take substantial amounts of time for assembly.

Therefore, a need exists for an improved engine access door slide track system that provides straightforward assembly and relatively low friction sliding of the engine access doors within the tracks.

SUMMARY OF THE INVENTION

The present invention is directed to engine access door slide pads providing low-friction engagement between access door(s) of an engine compartment and the slide tracks above and below the access door.

According to one aspect of the invention, an engine access door slide track system includes a support frame, a first engine access door, and a second engine access door. The support frame includes a plurality of frame members, a top track coupled to one of the plurality of frame members, and a bottom track included in one of the plurality of frame members. The first engine access door includes a top guide configured to interfit with the top track and a bottom guide configured to interfit with the bottom track. The second engine access door is coupled to the support frame.

According to another aspect of the invention, the top guide includes a channel configured to interfit with the top track, and the bottom guide includes a channel configured to interfit with the bottom track.

According to yet another aspect of the invention, the plurality of frame members includes a first frame member, a second frame member extending from a bottom surface of the first frame member adjacent a first end of the first frame member, a third frame member extending from a bottom surface of the first frame member spaced apart from a second end of the first frame member, and a fourth frame member oriented parallel to the first frame member and extending from a first end located at the second frame member and a second end beyond the third frame member. The top track is coupled to the first frame member, the fourth frame member includes the bottom track, and the fourth frame member is coupled to a platform.

According to another aspect of the invention, a method of installing an engine access door slide track system includes providing a support frame, the support frame including a plurality of frame members, a top track coupled to one of the plurality of frame members, and a bottom track including in one of the plurality of frame members, providing a first engine access door, the first engine access door having a top guide and a bottom guide, interfitting the top track with the top guide, interfitting the bottom track with the bottom guide, and coupling a second engine access door to the support frame.

According to yet another aspect of the invention, the method includes disposing a radiator between a plurality of receiving mounts of the support frame, coupling the support frame to the radiator, and coupling the plurality of receiving mounts to an engine compartment frame.

According to another embodiment of the invention, interfitting the top track with the top guide comprises disposing the top track within a channel of the top guide, and interfitting the bottom track with the bottom guide comprises disposing the bottom track within a channel of the bottom guide.

According to yet another aspect of the invention, an engine access door slide track system includes a support frame, a first engine access door, and a second engine access door. The support frame includes a first frame member having a first end and a second end, a second frame member extending from a lower surface of the first frame member adjacent the first end of the first frame member, a third frame member extending from the lower surface of the first frame member at a location spaced inward from the second end of the first frame member, and a fourth frame member oriented parallel to the first frame member, the fourth frame member having a first end disposed at the second frame member and extending to beyond the third frame member to a second end. A top track is coupled to the first frame member, and a bottom track is integrated with the fourth frame member. Further, the second end of the first frame and the second end of the fourth frame are aligned along a vertical plane. The first engine access door includes a top guide configured to interfit with the top track and a bottom guide configured to interfit with the bottom track. The second engine access door coupled to the second frame member.

According to another aspect of the invention, the top track extends from a first end aligned with a location between the second and third frame members and a second end aligned with the second end of the first frame member. Similarly, the bottom track extends from a first end aligned with a location between the second and third frame members and a second end aligned with the second end of the fourth frame member.

According to yet another aspect of the invention the fourth frame member includes a first leg oriented horizontally and a second leg extending from a top surface of the first leg. The second leg forms the bottom track. The first frame member includes a first leg oriented horizontally and a second leg extending from a top surface of the first leg. The top track is coupled to the top surface of the first leg.

According to another embodiment of the invention, the top track includes a first leg, the first leg oriented parallel to the first leg of the first frame member and directly coupled thereto, and a second leg extending from a bottom surface of the first leg of the top track. The second leg of the top track interfits with the top guide.

According to yet another embodiment of the invention, the second and third frame members each include a receiving mount configured to receive a radiator. Further, an engine compartment frame is coupled to the receiving mounts.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
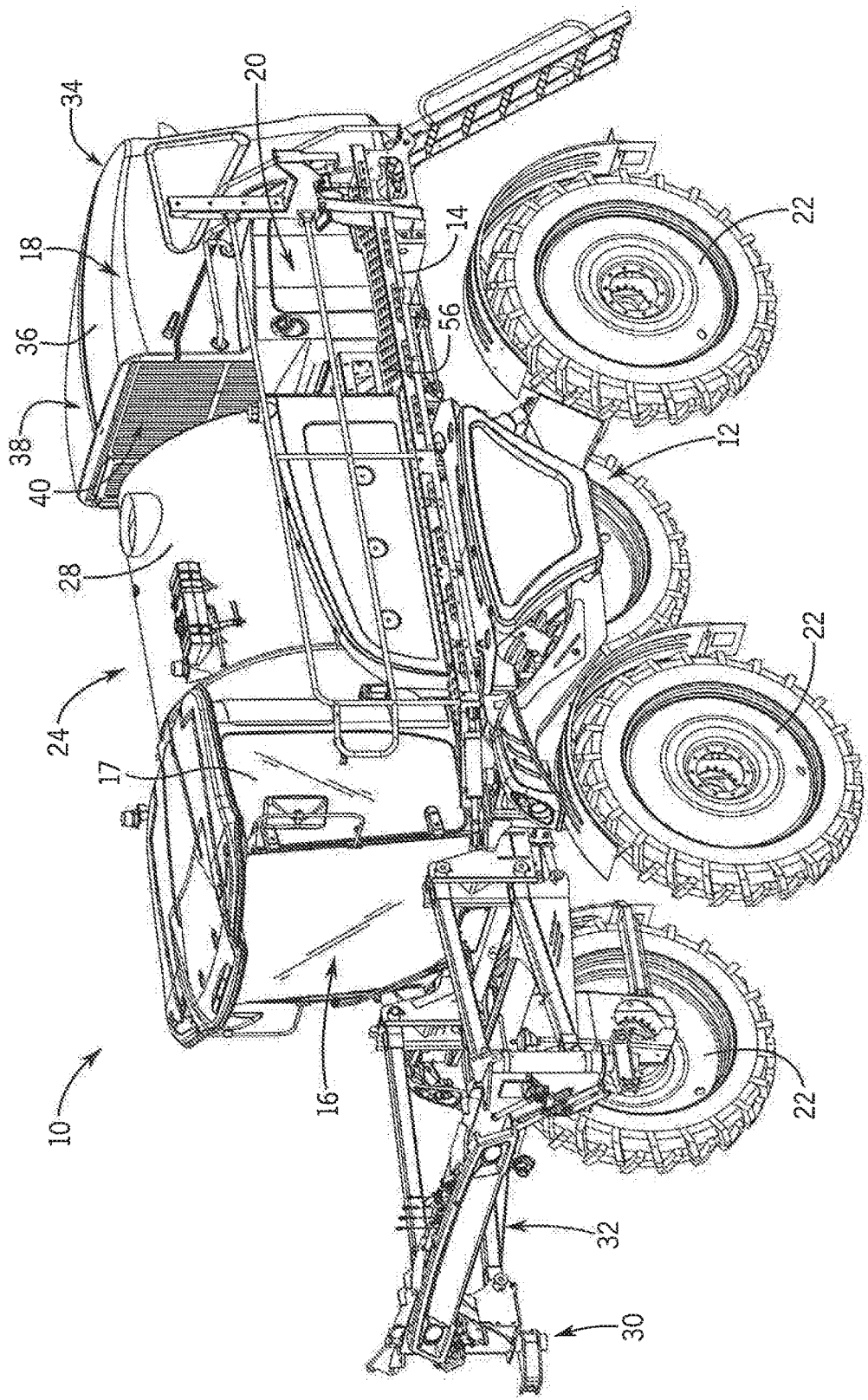
FIG. 1 is an isometric view of an agricultural machine.

Referring now to the drawings and specifically to FIG. 1, aspects of the invention are shown for use with an agricultural machine, for example, but not limited to, an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers, and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, an engine 18, an engine accessory system 34, and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as a rinse tank 26 for storing water or a rinsing solution and a product tank 28 for storing a volume of product for delivery onto an agricultural field with the sprayer 10. A product delivery pump can convey product from the product tank 28 through plumbing components such as interconnected pieces of tubing and through a boom tubing system for release out of spray nozzles that are spaced from each other along the width of the boom 30 during spraying operations of the sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. The boom 30 is connected to the chassis 12 with the lift arm assembly 32 that is configured to move the boom 30 up and down for adjusting the height of application of the product.

The engine 18 and the engine accessory system 34 are housed within an engine compartment 36. As shown in FIG. 1, the engine compartment 36 includes an engine access door slide track system 38 having at least one engine access door 40. While the representative embodiment of the invention depicts the engine access door slide track system 38 as being disposed on the front side 42 of the engine compartment 36, alternative embodiments of the invention may dispose the engine access door slide track system 38 on any side of the engine compartment 36 or any combination of sides of the engine compartment 36.

Figure 2:
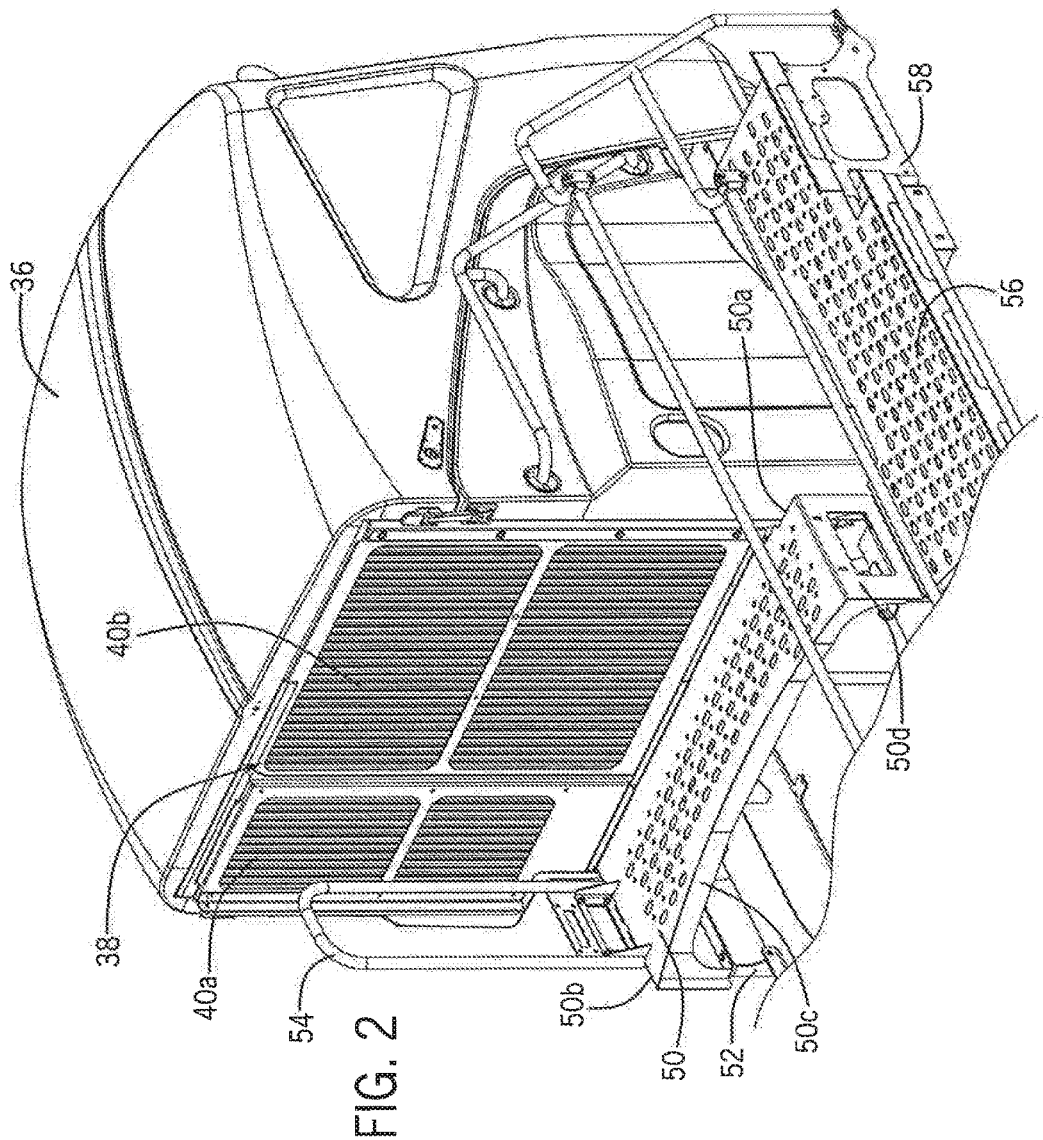
FIG. 2 is an enlarged isometric view of an engine compartment and an engine access door slide track system of the agricultural machine of FIG. 1, according to an embodiment of the invention.

Next, FIG. 2 illustrates an enlarged perspective view of the front side 42 of the engine compartment 36 and the engine access door slide track system 38. In the representative embodiment of the invention, the engine access door slide track system 38 includes two (2) engine access doors 40, which are designated as front/first access door 40a and rear/second access door 40b. As will be described in further detail below, at least one of the front access door 40a and the rear access door 40b is configured to slidably engage with a top track 44 of a support frame 46 and a bottom track 48 a support frame 46 adjacent to a platform 50. In alternative embodiments of the invention, the engine access door slide track 38 may include more or less than two (2) engine access doors 40.

As shown in FIG. 2, the platform 50 is disposed adjacent the engine compartment 36 in order to provide a user with a location to kneel or stand while using the engine access door slide track system 38 to access the engine compartment 36. The platform includes a four (4) edges, 50a, 50b, 50c, 50d. The first edge 50a is adjacent to and in contact with the engine access door slide track system 38. The second edge 50b is adjacent a first outer edge 52 of the chassis frame 14. For safety of the user, a handrail 54 may be coupled to the platform at the second edge 50b. The third edge 50c is adjacent the spray system 24 shown in FIG. 1. The third edge 50d is adjacent a walkway 56 disposed on the chassis frame. The walkway 56 is disposed on the chassis frame 14 along a second outer edge 58 of the chassis frame 14, opposite the first outer edge 52. As shown in FIG. 1, the walkway 56 allows a user to traverse from the engine compartment 36 to the operator cab 16.

Figure 3:
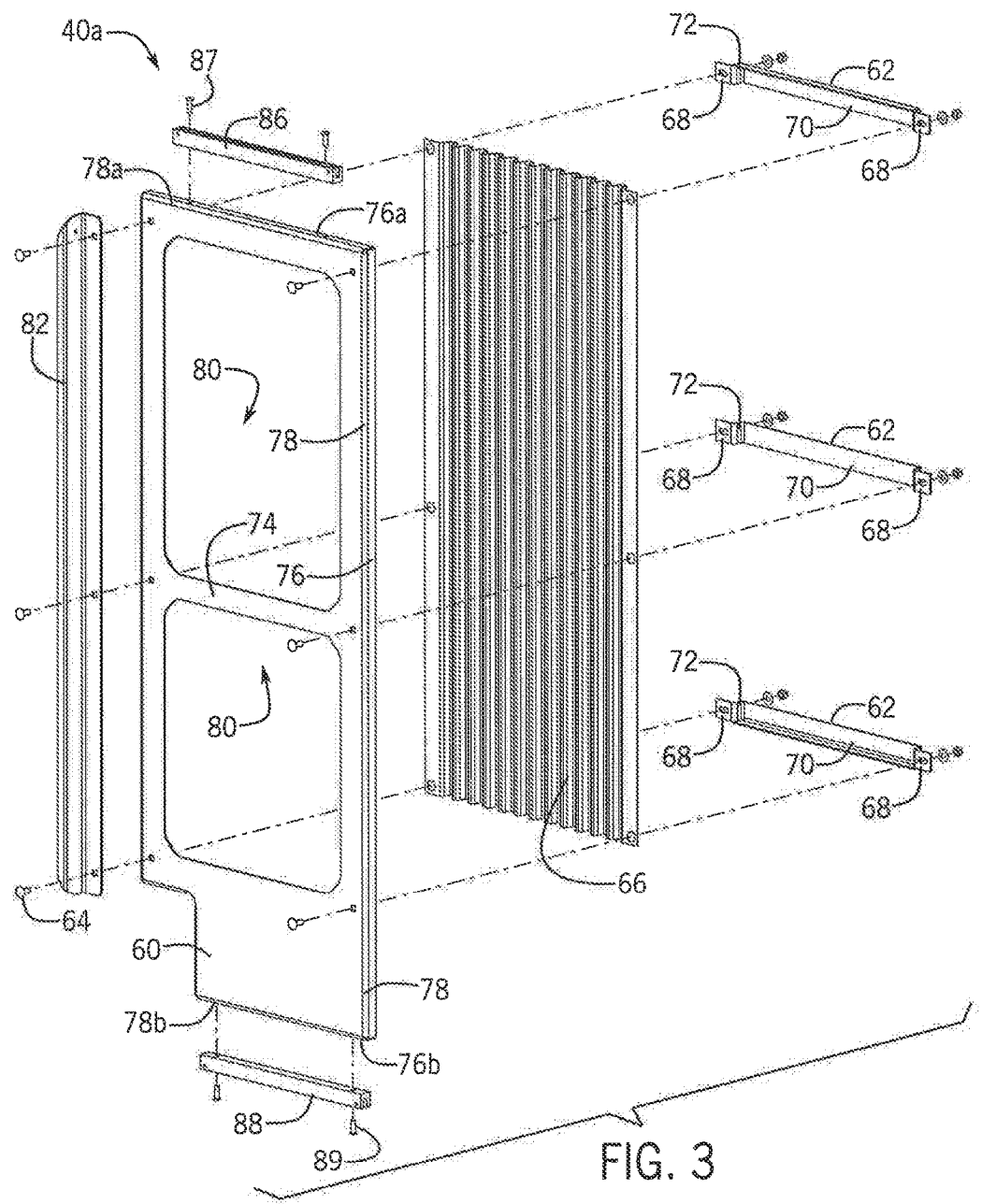
FIG. 3 is an exploded isometric view of a first access door of the engine access door slide track system, according to an embodiment of the invention.

Next, FIG. 3 depicts an exploded isometric view of the front access door 40a. The front access door 40a includes a front frame 60 and a plurality of rear braces 62 coupled together via fasteners 64. While the representative embodiment of the invention depicts the use of three (3) rear braces 62, other embodiments of the invention may use more or less than three (3) rear braces 62. A door screen 66 is disposed between the front frame 60 and the plurality of rear braces 62 and is secured between the frame 60 and rear braces 62 by the fasteners 64. The door screen 66 may comprise a corrugated material or any other appropriate door screen material.

The rear braces 62 include at least one mounting portion 68 and a bracing portion 70. The mounting portions 68 of each rear brace are configured to be adjacent the front frame 60 with a portion of the door screen 66 sandwiched therebetween. Meanwhile, the bracing portion 70 of each rear brace is offset from each mounting portion 68 by an arm 72. As a result, the bracing portion 70 is spaced apart from the front frame 60 and the door screen 66 in order to provide a cavity for the door screen 66 to be disposed within.

As shown in FIG. 3, the front frame 60 includes a main wall 74 and a plurality of wall segments 76 extending perpendicular from the edges 78 of the main wall 74 of the front frame 60. The main wall 74 includes at least one orifice 80 formed therethrough and configured to expose the door screen 66. Further, a handle 82 is coupled to an outer surface 84 of the main wall 74 of the front frame 60 near an edge of the main wall 74. While FIG. 3 depicts the handle 82 as being coupled to the outer surface 84 of the main wall 74 by way of a portion of the fasteners 64 used to couple the front frame 60 and the rear braces 62, it is also contemplated that the handle 82 may be coupled to the outer surface 84 of the main wall 74 by way of independent fasteners or other coupling methods, such as, but not limited to, welding and adhering.

The earlier discussed wall segments 76 include a top wall segment 76a extending perpendicular from a top edge 78a of the main wall 74 and a bottom wall segment 76b extending perpendicular from a bottom edge 78b of the main wall 74. A top guide 86 is coupled to the top wall segment 76a by way of at least one fastener 87. Meanwhile, a bottom guide 88 is coupled to the bottom wall segment 76b by way of at least one fastener 89. The top and bottom guides 86, 88 will be described in further detail later in this application.

Figure 4:
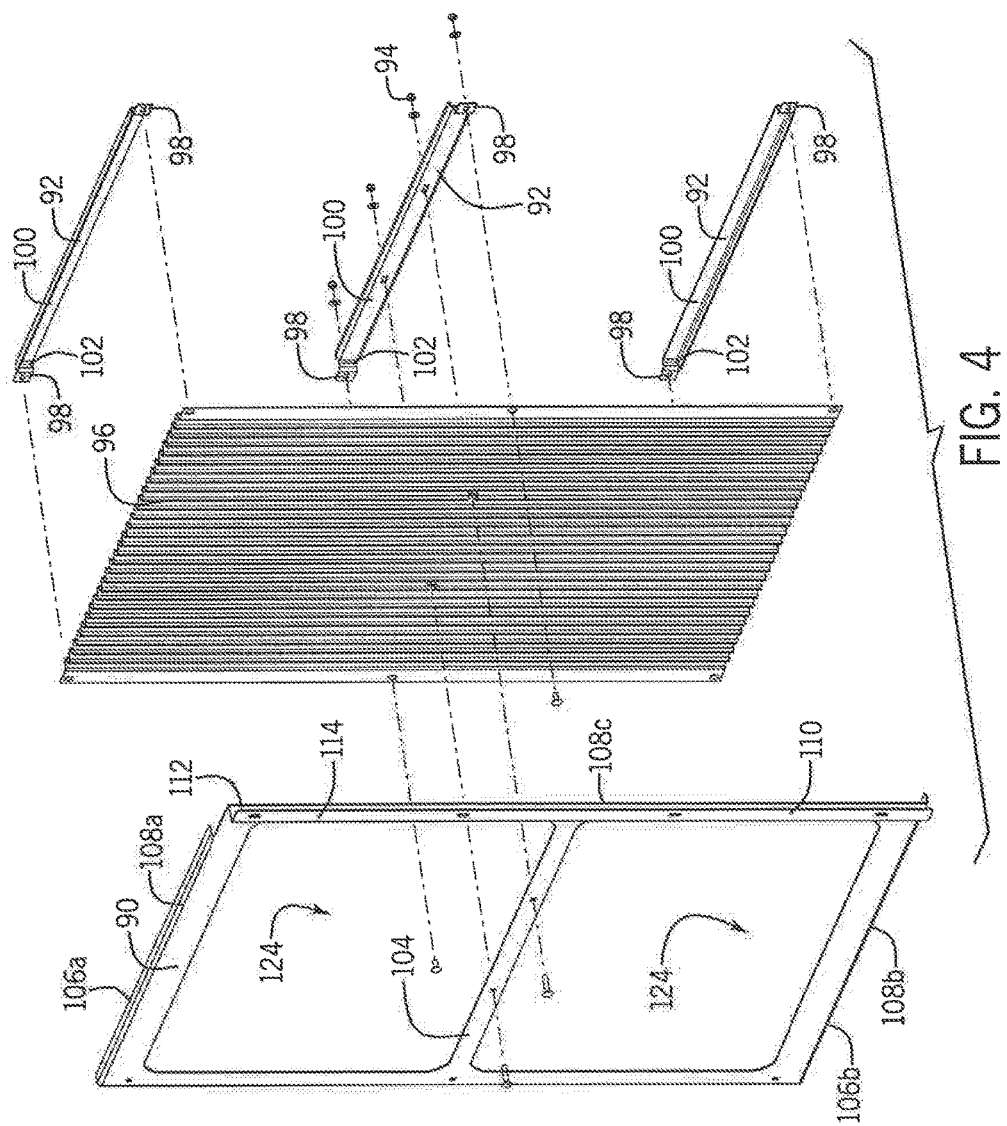
FIG. 4 is an exploded isometric view of a second access door of the engine access door slide track system, according to an embodiment of the invention.

FIG. 4 depicts an exploded isometric view of the rear access door 40b. Similar to the front access door 40a, the rear access door 40b includes a front frame 90 and a plurality of rear braces 92 coupled together via fasteners 94. In the representative embodiment of the invention, the rear access door 40b includes three (3) rear braces 94. However, in other embodiments of the invention, the rear access door 40b may include more or less than three (3) rear braces 94. The rear access door 40b also includes a door screen 96 disposed between the front frame 90 and the plurality of rear braces 92. The door screen 96 is secured between the frame 90 and rear braces 92 by the fasteners 94. Similar to the door screen 66 of the front access door 40a, the door screen 96 of the rear access door 40b may comprise a corrugated material or any other appropriate door screen material.

Similar to the rear braces 62 of the front access door 40a, the rear braces 92 of the rear access door 40b include at least one mounting portion 98 and a bracing portion 100. The mounting portions 98 of each rear brace 92 are located adjacent the front frame 90 with a portion of the door screen 96 sandwiched therebetween. The bracing portion 100 of each rear brace 92 is offset from each mounting portion 98 by an arm 102. As a result, the bracing portion 100 is spaced apart from the front frame 90 and the door screen 96, which creates a cavity for the door screen 96 to be disposed within.

The front frame 90 includes a main wall 104 and a plurality of wall segments 106. The plurality of wall segments 106 extend perpendicularly from less than or equal to all of the edges 108 of the main wall 104 of the front frame 90. In the representative embodiment of the invention, the wall segments 106 include a top wall segment 106a extending perpendicularly from a top edge 108a of the edges 108 and a bottom wall segment 106b extending perpendicularly from a bottom edge 108b of the edges 108. However, alternative embodiments of the invention may include other wall segments 106e extending from less than or equal to all the edges 108 of the main wall 104.

The front frame 90 may also include a mounting bar 110 extending from a side edge 108c of the main wall 104. In the representative embodiment of the invention, the mounting bar 110 includes a first leg 112 and a second leg 114. The first leg 112 extends perpendicularly from the side edge 108c of the main wall 104 at a first end 116 to a second end 118. It is contemplated that the first leg 112 may extend from the side edge 108c of the main wall 104 in a direction opposite the wall segments 106, as shown in FIG. 4, or the same direction as the wall segments 106. It is further contemplated that the first leg 112 may extend from the side edge 108c of the main wall 104 at any angle less than, greater than, or equal to 90 degrees. The second leg 114 extends from a first end 120 aligned with the second end 118 of the first leg 112 to a second end 122. While the second leg 114 is shown as extending perpendicularly from the first leg 112 and in a direction away from the main wall 104, it is contemplated that the second leg 114 may extend from the first leg 112 at any angle and in any direction. Further, the main wall 94 includes at least one orifice 124 formed therethrough in order to expose the door screen 96.

Figure 5:
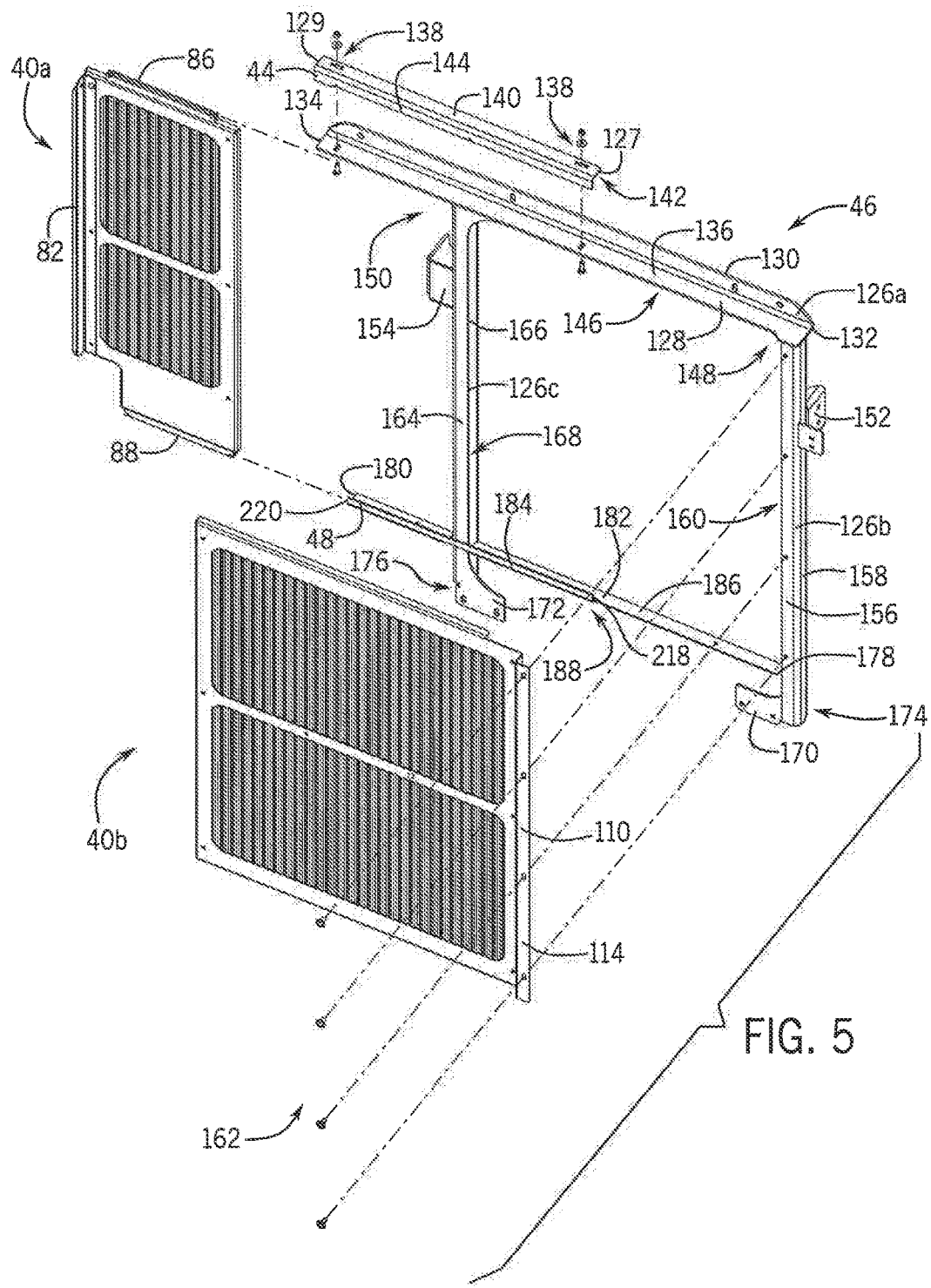
FIG. 5 is a partial exploded isometric view of the engine access door slide track system, according to an embodiment of the invention.

Now referring to FIG. 5, an exploded isometric view illustrating the interfit between the engine access doors 40 and the support frame 46 of the engine access door slide track system 38 is shown. The support frame 46 includes a plurality of frame members 126. While the representative embodiment illustrates the use of a first frame member 126a, a second frame member 126b, a third frame member 126c, and a fourth frame member 126d, other embodiments of the invention may use a support frame 46 having more or less than four (4) frame members 126.

The first frame member 126a is oriented horizontally and extends along the top of the support frame 46. The first frame member 126a also may include a first leg 128 and a second leg 130 extending from a first end 132 to a second end 134 of the first frame member 126a. The first leg 128 is oriented horizontally and the second leg 130 extends upward from a top surface 136 of the first leg 128. While the representative embodiment of the invention depicts the second leg 130 extending perpendicular to the first leg 128, it is contemplated that the second leg 130 may extend from the top surface 136 of the first leg 128 at any angle.

The top track 44 is coupled to the first leg 128 of the first frame member 126a by way of fasteners 138. In other embodiments, alternative means may be used to couple the first frame member 126a and the top track 44. In the representative embodiment of the invention, the top track 44 includes a first leg 140 oriented parallel to the first leg 128. The top track 44 is configured so that a bottom surface 142 of the first leg 140 of the top track is in contact with the top surface 136 of the first leg 128 of the first frame member 126a. The top track 44 further includes a second leg 144 extending downward from the bottom surface 142 of the first leg 140. While the representative embodiment of the invention depicts the second leg 144 extending perpendicular to the first leg 140, the second leg 144 is also contemplated to extend from the bottom surface 142 of the first leg 140 at any angle.

The top track 44 extends from a first end 127 to a second end 129. The second end 129 of the top track 44 is aligned with the second end 134 of the first frame member 126a. The first end 127 of the top track 44 is aligned with a location 131 between the second and third frame members 126b, 126c. As will be described later in further detail, the second leg 144 of the top track 44 is configured to interfit with the top guide 86 of front access door 40a.

The second and third frame members 126b, 126c extend downward from the first frame member 126a. The second frame member 126b extends from a bottom surface 146 of the first leg 128 of the first frame member 126a at a location 148 at or adjacent to the first end 132 of the first frame member 126a. The third frame member 126c extends from the bottom surface 146 of the first leg 128 of the first frame member 126a at a location 150 spaced away from the second end 134 of the first frame member 126a. In alternative embodiments of the invention, locations 148, 150 may be located anywhere along the length of the first leg 128 of the first frame member 126a.

The second frame member 126b includes a first leg 156 oriented parallel to the engine access doors 40. The second frame member 126b also includes a second leg 158 extending from an inner surface 160 of the first leg 156. While the representative embodiment of the invention depicts second leg 158 being oriented perpendicular to the first leg 156, it is also contemplated that the second leg 158 may extend from the inner surface 160 of the first leg 156 at any angle.

Further, the first leg 156 is configured to be oriented parallel to the second leg 114 of the mounting bar 110 of the rear access door 40b. As shown in FIG. 5, when the rear access door 40b is coupled to the support frame 46, the second leg 114 of the mounting bar 110 is directly coupled to the first leg 156 of the second frame member 126b by way of fasteners 162.

Similar to the second frame member 126b, the third frame member 126c includes a first leg 164 oriented parallel to the engine access doors 40. The third frame member 126c also includes a second leg 166, which extends from an inner surface 168 of the first leg 164. In the representative embodiment of the invention, the second leg 166 extends from the inner surface 168 of the first leg 164 perpendicular thereto. However, in other embodiments of the invention, the second leg 166 may extend from the inner surface 168 of the first leg 164 at any angle.

The first legs 156, 164 or the second and third frame members 126b, 126c may also include mounting portions 170, 172, respectively. The mounting portion 170 of the second frame member 126b is located at a bottom portion 174 of the first leg 156. The mounting portion 172 of the third frame member 126c is located at a bottom portion 176 of the first leg 164. The second and third frame members 126b, 126c may also include receiving mounts 152, 154, respectively, which will be described later in further detail.

The fourth frame member 126d is oriented parallel to the first frame member 126a and perpendicular to the second and third frame members 126b, 126c. A first end 178 of the fourth frame member 126d is disposed next to the first leg 156 of the second frame member 126b. The fourth frame member 126d extends beyond the third frame member 126c to a second end 180 aligned along the same vertical plane as the second end 134 of the first frame member 126a. The fourth frame member 126d includes a first leg 182 oriented parallel to the first leg 128 of the first frame member 126a. The fourth frame member 126d also includes a second leg 184 extending from a top surface 186 of the first leg 182. The second leg 184 extends from the second end 180 of the fourth frame member 126a to a location 188 between the second and third frame members 126b, 126c.

In different embodiments of the invention, the fourth frame member 126d may be coupled to the second and third frame members 126b, 126c, coupled to the platform 50, or both. Additionally, the second leg 184 of the fourth frame member 126d forms the bottom track 48 of the engine compartment door slide track system 38. As such, the bottom track 48 is integrated into the fourth frame member 126d. As will be described later in further detail, the bottom track 48 is configured to interfit with the bottom guide 88 of the front access door 40a.

Figure 6:
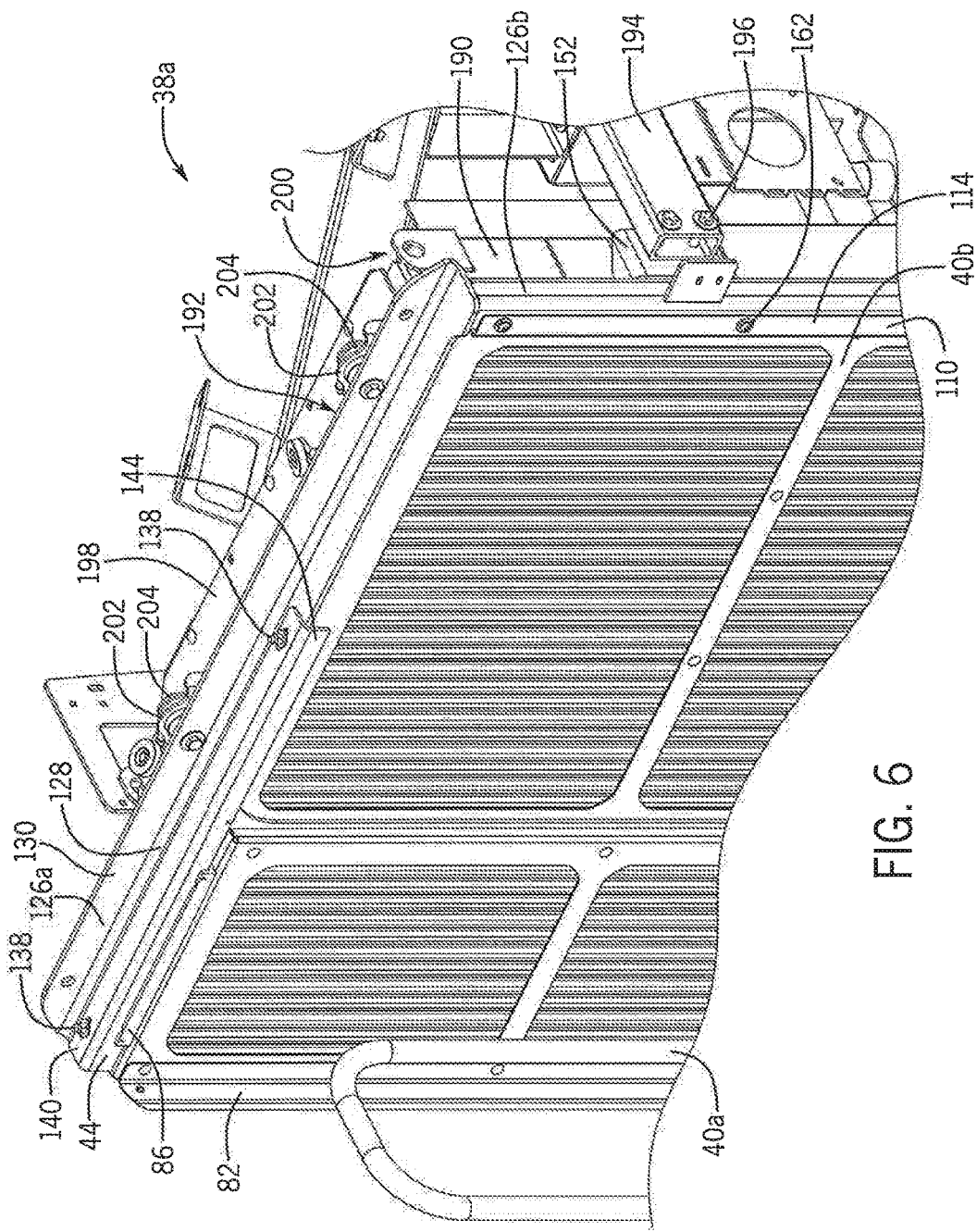
FIG. 6 is an enlarged front isometric view of the engine access door slide track system, according to an embodiment of the invention.

FIG. 6 represents an enlarged view of a top portion 38a of the engine access door slide track system 38 without the outer shell of the engine compartment 36. The mounting bar 110 of the rear access door 40b is shown coupled to the second frame member 126b of the support frame 46 by way of the fasteners 162. The top track 44 is shown coupled to the first frame member 126b by way of fasteners 138, as described in detail above. The top track 44 is also shown interfitting with the top guide 86 of the front access door 40a, which will be described further below.

Figure 7:
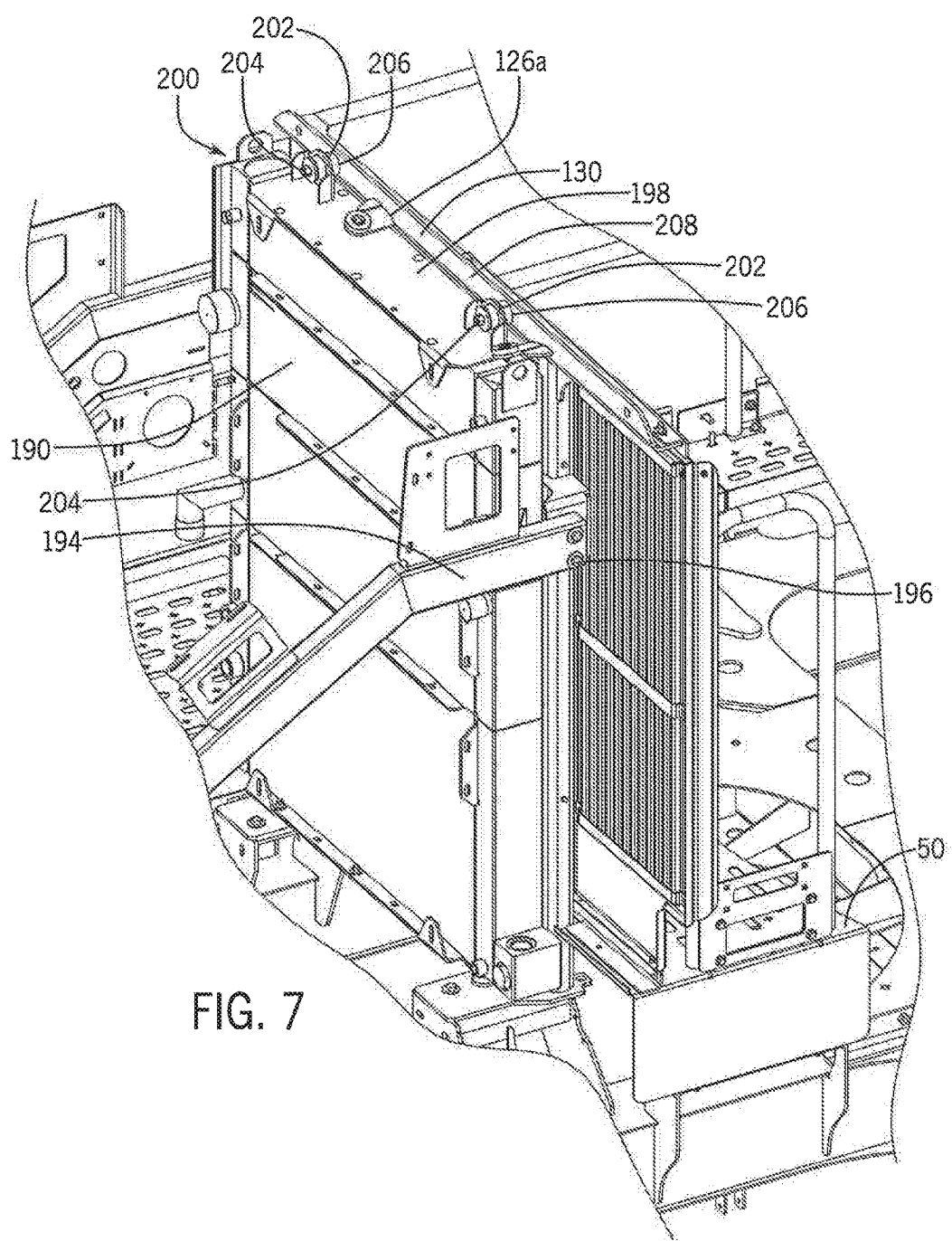
FIG. 7 is an enlarged rear isometric view of the engine access door slide track system, according to an embodiment of the invention.

FIGS. 6 and 7 both depict a radiator 190 disposed adjacent the inner surface 192 of the support frame 46. The radiator 190 may also be disposed between the receiving mounts 152, 154 extending from the second and third frame members 126*b*, 126*c*, respectively. As shown in FIG. 6, the receiving mounts 152, 154 may be coupled to the engine compartment frame 194 via fasteners 196.

In the representative embodiment of the invention, a radiator bracket 198 is disposed along a top surface 200 of the radiator 190 and coupled thereto. The radiator bracket 198 may include mounting portions 202 oriented parallel to the second leg 130 of the first frame member 126*a*. Each mounting portion 202 may be coupled to the second leg 130 of the first frame member 126*a* by way of fasteners 204. As a result, the support frame 46 is coupled to the radiator 190. In some embodiments of the invention, a spacer may be disposed between each mounting portion 202 and an inner surface 208 of the second leg 130 of the first frame member 126*a*.

Figure 8:
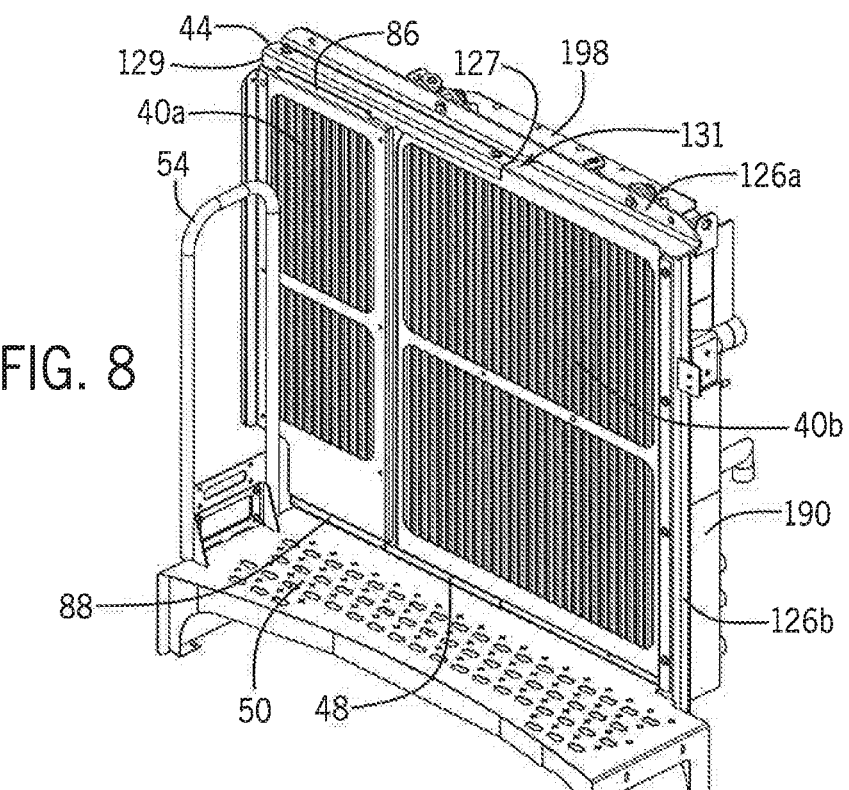
FIG. 8 is a front isometric view of the engine access door slide track system with access doors in a closed position, according to an embodiment of the invention.
Figure 9:
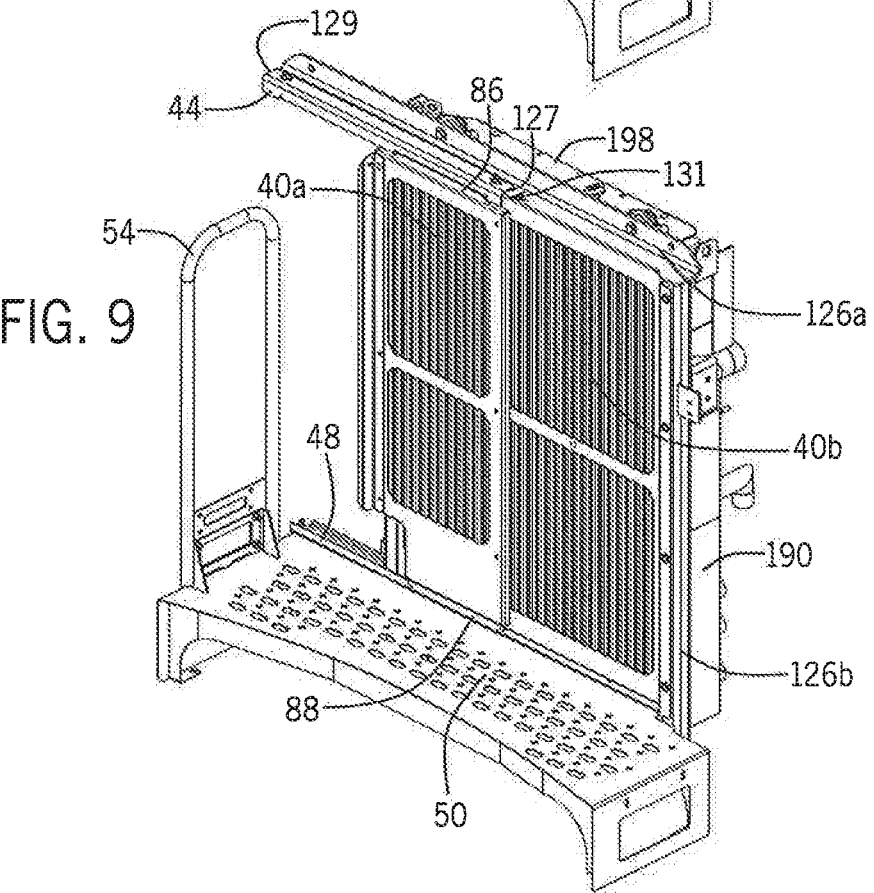
FIG. 9 is a front isometric view of the engine access door slide track system with access doors in an open position, according to an embodiment of the invention.
Figure 10:
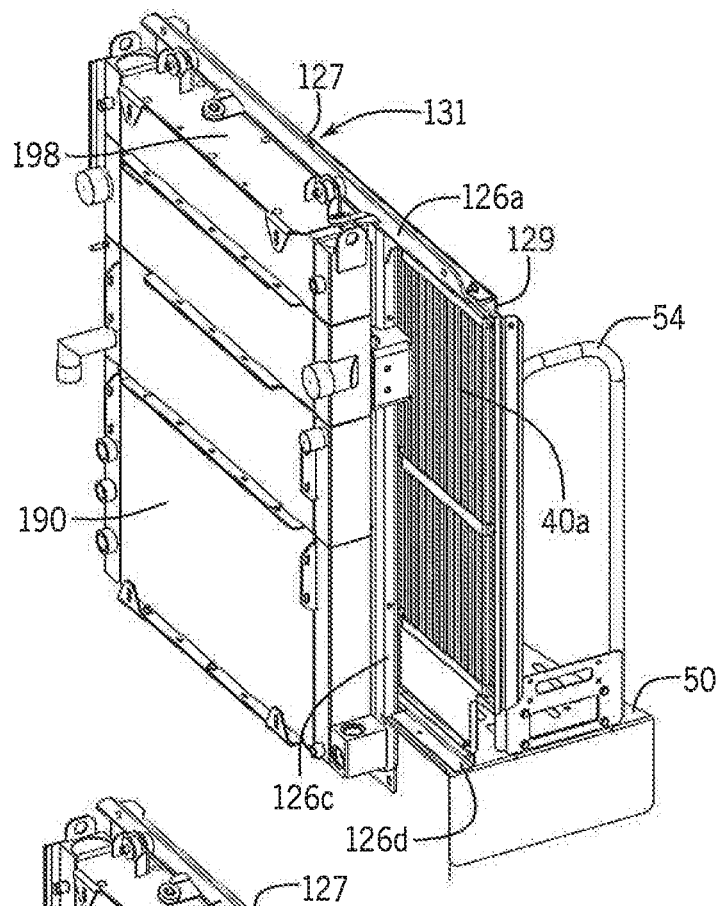
FIG. 10 is a rear isometric view of the engine access door slide track system with access doors in the closed position, according to an embodiment of the invention.
Figure 11:
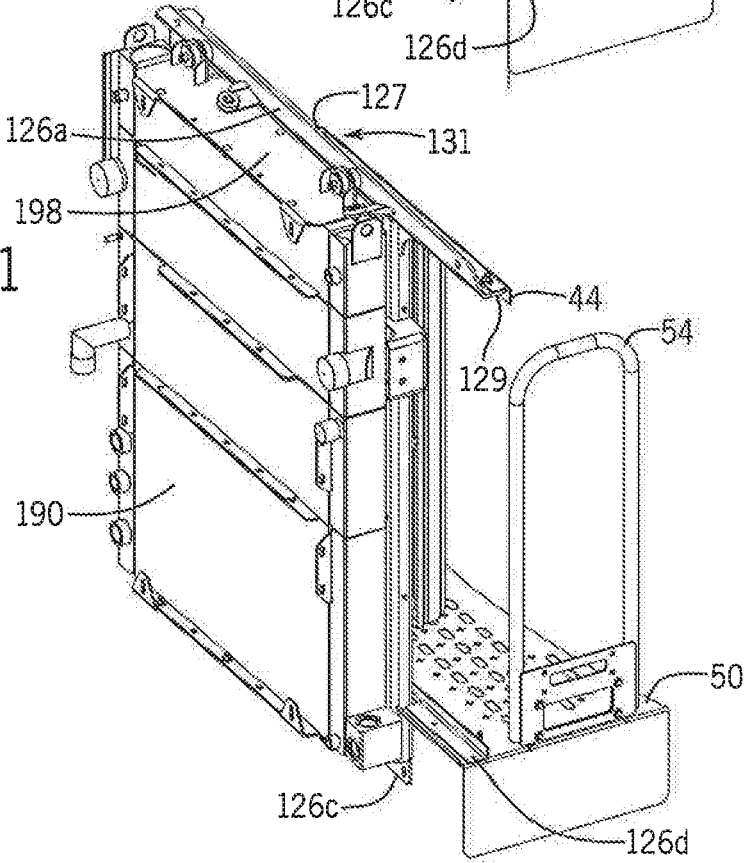
FIG. 11 is a rear isometric view of the engine access door slide track system with access doors in the open position, according to an embodiment of the invention.
Figure 12:
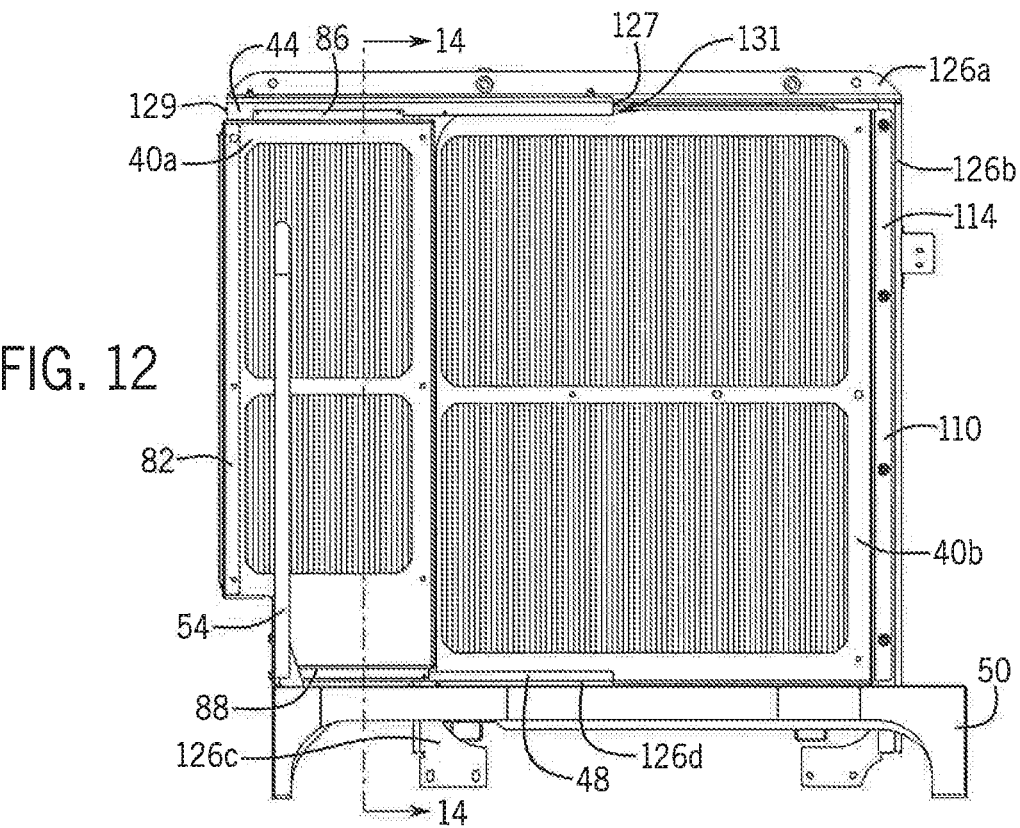
FIG. 12 is a front view of the engine access door slide track system with access doors in the closed position, according to an embodiment of the invention.
Figure 13:
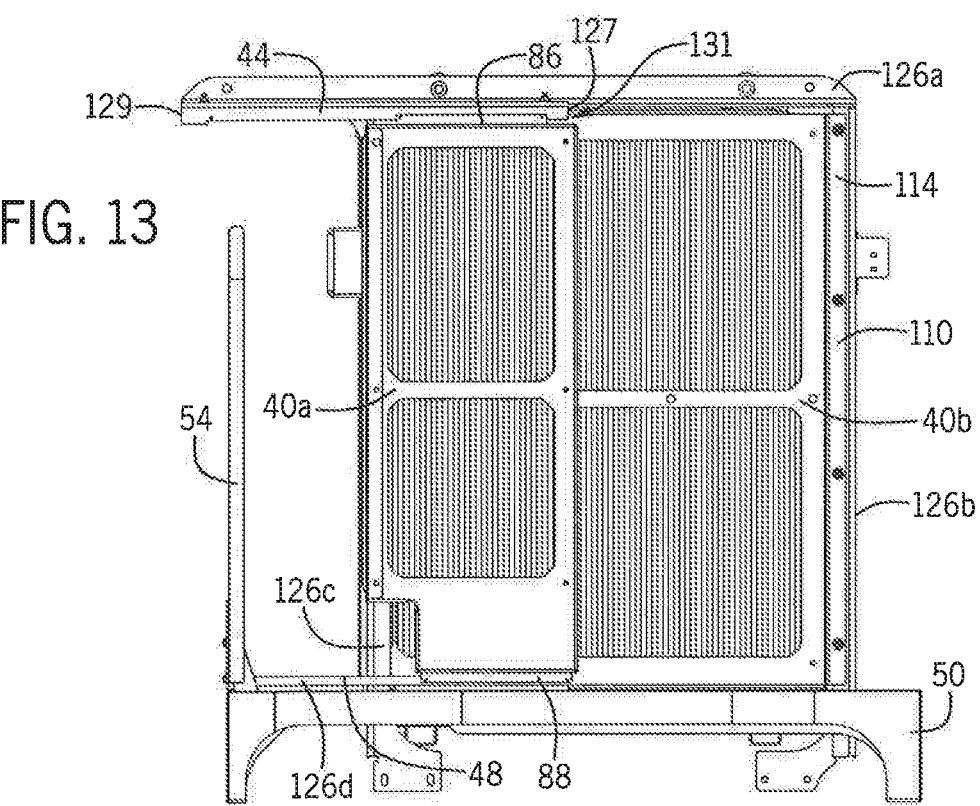
FIG. 13 is a front view of the engine access door slide track system with access doors in the open position, according to an embodiment of the invention.

FIGS. 8-11 depict front and rear isometric view of the engine access door slide track system 38. In FIGS. 8 and 10, the front access door 40*a* is in a closed position 210. In the closed position 210, the front access door 40*a* is located adjacent the second end 129 of the top track 44. In FIGS. 9 and 11, the front access door 40*a* is shown in an open position 212. In the open position 212, the front access door 40*a* is located adjacent the first end 127 of the top track 44. Next, FIGS. 12 and 13 illustrates a front view of the engine access door slide track system 38 with the front access door 40*a* in the closed position 210 and the open position 212, respectively.

Figure 14:
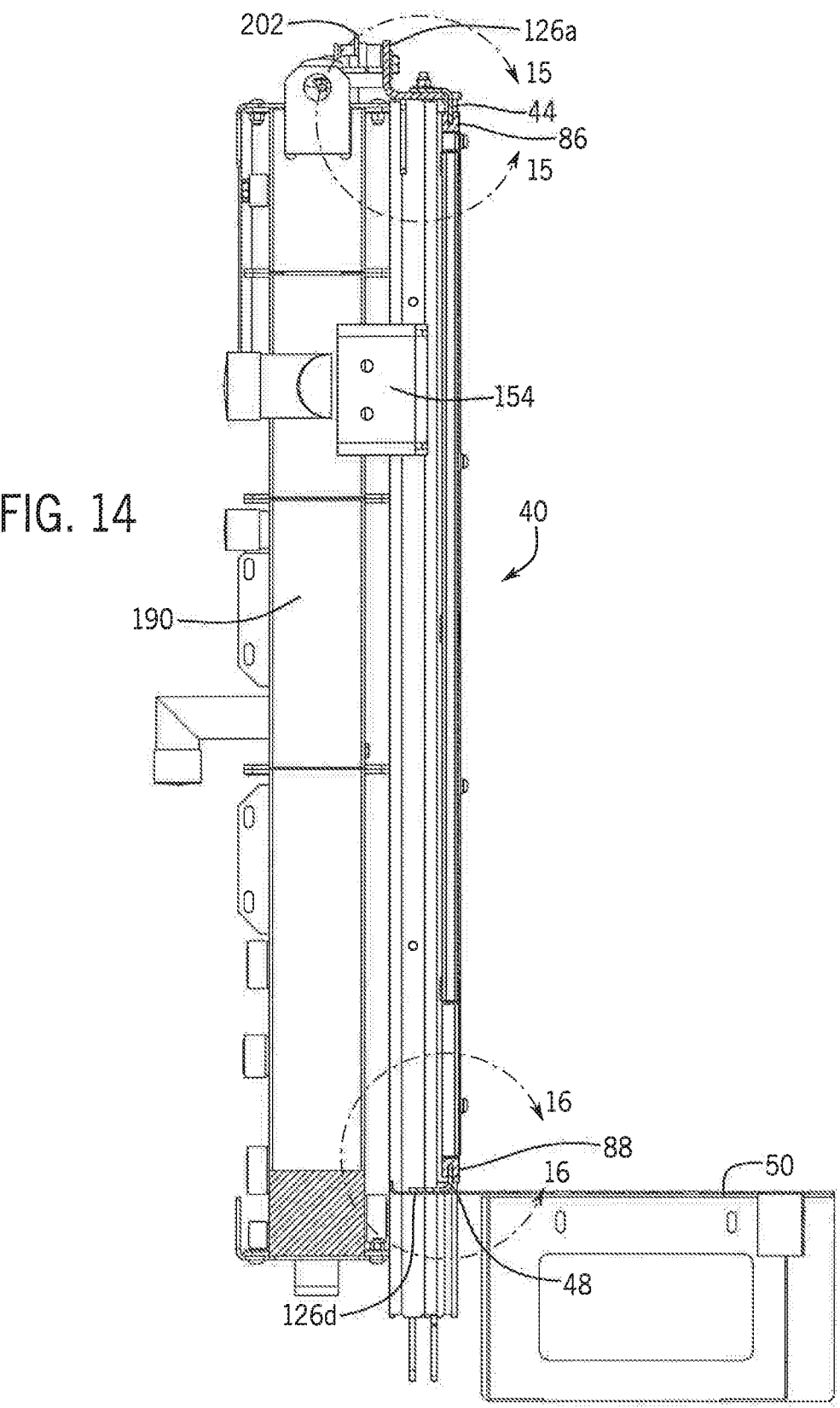
FIG. 14 is a cross-sectional view of the engine access door slide track system of FIG. 12, taken along line 14-14.

Now referring to FIG. 14, a cross-sectional view of the engine access door slide track system 38 is shown. Portions 15-15 and 16-16 of FIG. 14 depict enlarged cross-sectional views of the interfit between the top track 44 and the top guide 86 and the interfit between the bottom track 48 and the bottom guide 88, respectively.

Figure 15:
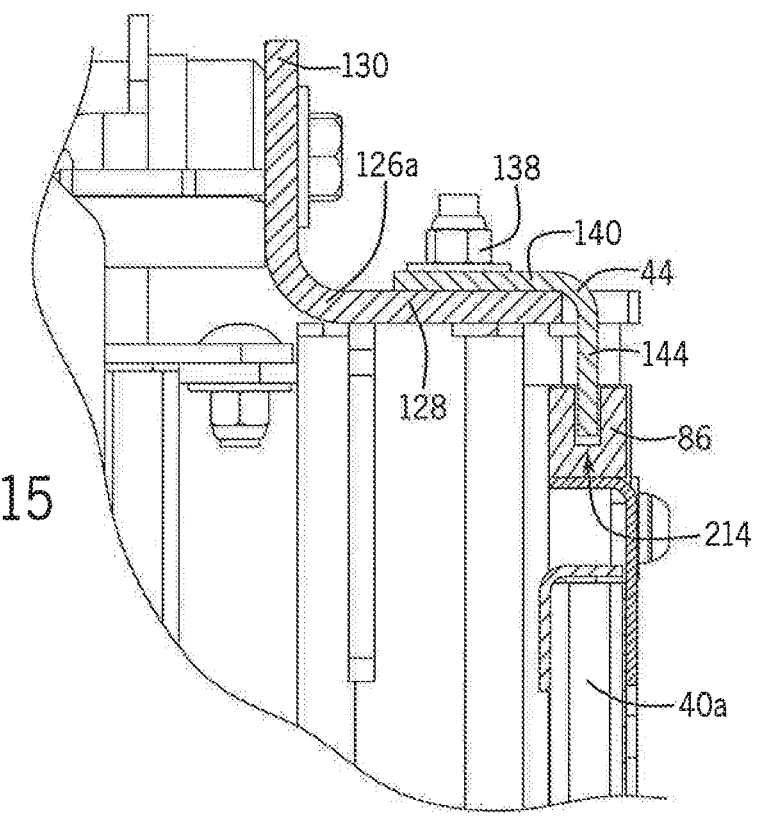
FIG. 15 is an enlarged side view of the portion 15-15 of FIG. 11.

Portion 15-15 is illustrated in FIG. 15. As shown, the top guide 86 includes a channel 214 formed therein. As a result, the top guide 86 is in a U-shape. The channel 214 of the top guide 86 is configured to receive the second leg 144 of the top track 44. The top guide 86 is able to the slide between the first and second ends 127, 129 of the top track 44 as the second leg 144 of the top track 44 is maintained within the channel 214 of the top guide 86.

Figure 16:
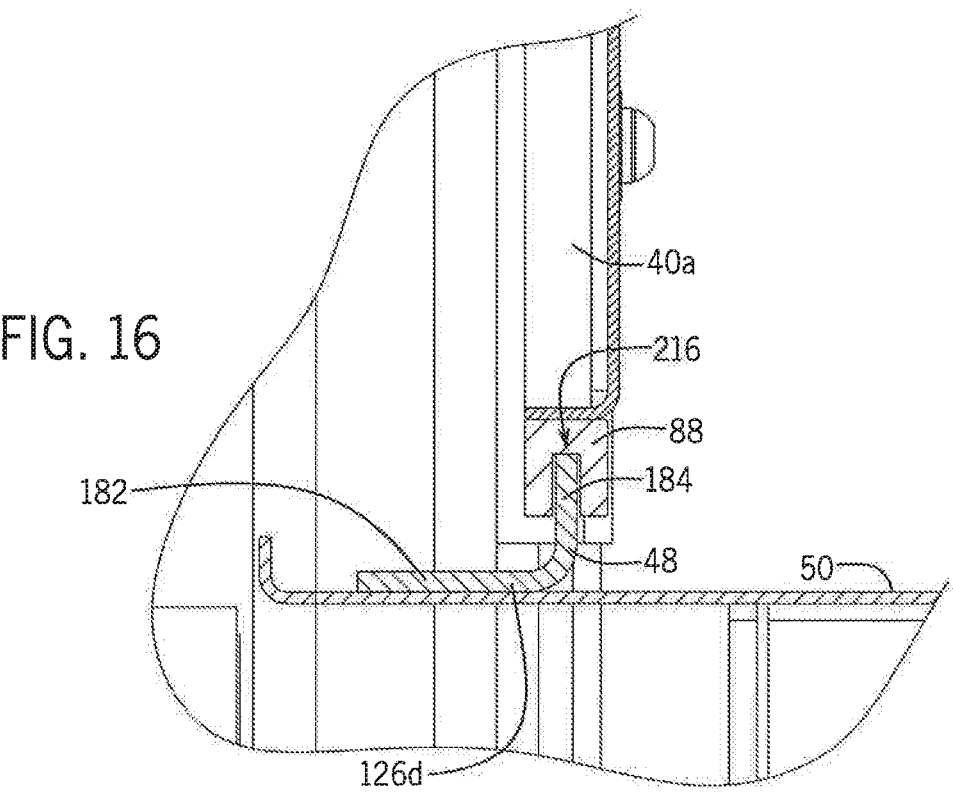
FIG. 16 is an enlarged side view of the portion 13-13 of FIG. 16.

Portion 16-16 is illustrated in FIG. 16. Similar to the top guide 86, the bottom guide 88 includes a channel 216 formed therein and resulting the bottom guide 88 having a U-shape. The channel 216 of the bottom guide 88 is configured to receive the second leg 184 of the fourth frame member 126*d*. The bottom guide 88 is able to slide between a first end 218 of the second leg 184 disposed at the location 188 and the a second end 220 of the second leg 184 disposed at the second end 180 of the fourth frame member 126*d*.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. An engine access door slide track system for an agricultural machine comprising:
    a support frame having:
        a plurality of frame members;
        a top track coupled to one of the plurality of frame members; and
        wherein one of the plurality of frame members includes a bottom track;
    a first engine access door having a top guide configured to interfit with the top track and a bottom guide configured to interfit with the bottom track;
    a second engine access door coupled to the support frame.

2. The engine access door slide track system of claim 1 wherein the support frame is coupled to a radiator.

3. The engine access door slide track system of claim 2 wherein the support frame includes a plurality of receiving mounts configured to receive the radiator therebetween.

4. The engine access door slide track system of claim 3 wherein an engine compartment frame is coupled to the plurality of receiving mounts.

5. The engine access door slide track system of claim 1 wherein the top guide includes a channel configured to interfit with the top track.

6. The engine access door slide track system of claim 1 wherein the bottom guide includes a channel configured to interfit with the bottom track.

7. The engine access door slide track system of claim 1 wherein the plurality of frame members includes:
    a first frame member;
    a second frame member extending from a bottom surface of the first frame member adjacent a first end of the first frame member;
    a third frame member extending from a bottom surface of the first frame member spaced apart from a second end of the first frame member; and
    a fourth frame member oriented parallel to the first frame member and extending from a first end located at the second frame member and a second end beyond the third frame member.

8. The engine access door slide track system of claim 6 wherein the top track is coupled to the first frame member, the fourth frame member includes the bottom track, and the fourth frame member is coupled to a platform.

9. The engine access door slide track system of claim 6 wherein the rear access door includes a mounting bar extending therefrom and coupled to the second frame member.

10. A method of installing an engine access door slide track system in an agricultural machine, the method comprising:
    providing a support frame, the support frame including a plurality of frame members, a top track coupled to one of the plurality of frame members, and a bottom track including in one of the plurality of frame members;
    providing a first engine access door, the first engine access door having a top guide and a bottom guide;
    interfitting the top track with the top guide;
    interfitting the bottom track with the bottom guide;
    coupling a second engine access door to the support frame.

11. The method of claim 10 further comprising disposing a radiator between a plurality of receiving mounts of the support frame, coupling the support frame to the radiator, and coupling the plurality of receiving mounts to an engine compartment frame.

12. The method of claim 11 wherein interfitting the top track with the top guide comprises disposing the top track within a channel of the top guide, and wherein interfitting the bottom track with the bottom guide comprises disposing the bottom track within a channel of the bottom guide.

13. An engine access door system of an agricultural machine comprising:
    a support frame including:
        a first frame member having a first end and a second end;

a second frame member extending from a lower surface of the first frame member adjacent the first end of the first frame member;

a third frame member extending from the lower surface of the first frame member at a location spaced inward from the second end of the first frame member;

a fourth frame member oriented parallel to the first frame member, the fourth frame member having a first end disposed at the second frame member and extending to beyond the third frame member to a second end;

a top track coupled to the first frame member;

a bottom track integrated with the fourth frame member; and wherein the second end of the first frame and the second end of the fourth frame are aligned along a vertical plane;

a first engine access door having a top guide configured to interfit with the top track and a bottom guide configured to interfit with the bottom track; and a second engine access door coupled to the second frame member.

14. The engine access door system of claim 13 wherein the top guide includes a U-shaped channel configured to receive the top track, and wherein the bottom guide includes a U-shaped channel configured to receive the bottom track.

15. The engine access door system of claim 13 wherein the top track extends from a first end aligned with a location between the second and third frame members and a second end aligned with the second end of the first frame member.

16. The engine access door system of claim 13 wherein the bottom track extends from a first end aligned with a location between the second and third frame members and a second end aligned with the second end of the fourth frame member.

17. The engine access door system of claim 13 wherein the fourth frame member includes a first leg oriented horizontally and a second leg extending from a top surface of the first leg;

wherein the second leg comprises the bottom track.

18. The engine access door system of claim 13 wherein the first frame member includes a first leg oriented horizontally and a second leg extending from a top surface of the first leg;

wherein the top track is coupled to the top surface of the first leg.

19. The engine access door system of claim 18 wherein the top track includes a first leg, the first leg oriented parallel to the first leg of the first frame member and directly coupled thereto, and a second leg extending from a bottom surface of the first leg of the top track;

wherein the second leg of the top track interfits with the top guide.

20. The engine access door system of claim 13 wherein the second and third frame members each include a receiving mount configured to receive a radiator; and wherein an engine compartment frame is coupled to the receiving mounts.

* * * * *